United States Patent [19]

Borer et al.

[11] Patent Number: 5,004,492
[45] Date of Patent: Apr. 2, 1991

[54] GLASS SHEET CONVEYING AND BENDING APPARATUS

[75] Inventors: John W. Borer, Toledo; William J. Skilliter, Genoa, both of Ohio; Lowell J. Conner, Lathrop, Calif.

[73] Assignee: Libbey-Owens-Ford Co., Toledo, Ohio

[21] Appl. No.: 400,465

[22] Filed: Aug. 29, 1989

[51] Int. Cl.$^5$ .............................................. C03B 23/03
[52] U.S. Cl. ........................................ 65/289; 65/287
[58] Field of Search ................ 65/289, 287, 273, 275, 65/106

[56] References Cited

U.S. PATENT DOCUMENTS

| | | | |
|---|---|---|---|
| 3,338,695 | 8/1967 | Ritter | 65/289 |
| 4,167,997 | 9/1979 | Revells | 65/273 |
| 4,339,259 | 7/1982 | Paudice et al. | 65/273 |
| 4,447,252 | 5/1984 | Di Nocco et al. | 65/273 |
| 4,670,036 | 6/1987 | Enk et al. | 65/289 |
| 4,753,668 | 6/1988 | Honjo et al. | 65/273 |
| 4,830,650 | 5/1989 | Kelly | 65/273 |

*Primary Examiner*—Joye L. Woodard
*Attorney, Agent, or Firm*—Marshall & Melhorn

[57] ABSTRACT

The invention comprises press bending apparatus including a continuous uninterrupted peripheral shaping rail mounted for vertical reciprocating movement for lifting a heated glass sheet from a roll conveyor and pressing it against a complementary shaping surface. Conveyor rolls are provided exteriorly of the shaping rail for advancing a sheet into position over the shaping rail, and additional separate rolls are mounted so as to be disposed within the confines of the shaping rail for supporting the sheet interiorly of the shaping rail. An arrangement is provided beneath the shaping rail for supporting and driving the interior rolls so as to permit vertical movement of the shaping rail between the interior and exterior rolls.

17 Claims, 4 Drawing Sheets

GLASS SHEET CONVEYING AND BENDING APPARATUS

BACKGROUND OF THE INVENTION

1. Field of the Invention

This invention pertains generally to apparatus for the press bending of glass sheets, and more particularly to such apparatus including specially configured conveyor rolls mounted and driven within the confines of a continuous peripheral press bending ring.

2. Description of the Prior Art

In accordance with a widely used procedure for the production of curved or bent glass sheets in large quantities as required in the mass production of glazing units for the automobile industry and the like, sheets are advanced one after another along a generally horizontal path on roll-type conveyors successively through heating and bending areas, and finally through a heat treating area wherein the bent sheets are suitably annealed or tempered, as the case may be, in accordance with the end use for which they are destined.

The glass sheets are heated to their softening point in passing through the heating area, and are then advanced into the bending area and precisely positioned therein between complementary upper and lower shaping members as by engagement of their leading edge by locating stop members projecting into the path of the advancing sheets. The properly oriented sheet is then engaged along its lower marginal of edge portions by the lower press member and lifted from the conveyor rolls to be pressed to the precise predetermined curvature between the complemental shaping surfaces of the press members.

The lower or so called female press member in such press bending apparatus is generally of ring-type construction comprising a peripheral shaping rail which engages only the marginal edges of the sheets in urging them into engagement with the complemental male shaping member. Heretofore, in order to allow the shaping rail of the lower press member to be moved vertically between its lowered and raised positions below and above the conveyor, the shaping rail has been formed of a number of individual segments disposed end-to-end to define the desired outline pattern. The adjacent ends of the segments are spaced apart to provide gaps through which the rolls of the conveyor pass as the shaping rail is raised and lowered. In bending glass sheets of generally rectangular configuration as have been commonly employed in automobiles, the shaping rails are of a substantially rectangular configuration in plan. Thus two sides, generally the long sides, can be formed of continuous segments extending parallel to and positioned between the rolls and the other two sides of the shaping rail, which are oriented normal to the rolls are formed of short segments spaced apart a distance slightly greater than the diameter of the rolls. Since the rolls are of relatively small diameter in the bending section, the spaces or gaps between adjacent segments of the shaping rail can likewise be relatively small so that sagging of the heat-softened glass in the unsupported spaces between adjacent segments will be insignificant, if not non-existent.

As automobile styling has evolved, more complex and elaborate glass shapes of non-rectangular outline have been employed. The similarly configured shaping rails required to bend the glass parts often have portions intersecting the rolls at acute angles. Consequently, the spacing between adjacent shaping rail segments must be increased to the point that difficulty is encountered in press bending the parts to the desired curvatures or shapes due to the tendency of the heat-softened sheets to sag between the widely spaced-apart shaping rail segments. In order to alleviate this problem there has been suggested in U.S. Pat. No. 4,116,662, conveyor rolls formed of two sections individually driven for rotation and rigidly interconnected at their adjacent inner ends so as to require a minimum of clearance openings in the associated press shaping rail to accommodate relative vertical movement between the shaping rail and conveyor rolls. Such rolls nevertheless require that the shaping rail be provided with gaps for accommodating the interconnecting members, as well as mechanism for pivoting the rolls between lowered and raised positions in conjunction with the vertical reciprocating movement of the shaping rails.

SUMMARY OF THE INVENTION

In accordance with the invention there is provided press bending apparatus comprising a continuous, uninterrupted peripheral shaping rail mounted for vertical reciprocating movement for lifting a sheet from a roll conveyor and pressing it against a complementary shaping surface for shaping the sheet to the desired configuration within the bending area. Exterior conveyor rolls are provided outside the shaping rail for carrying a sheet into position over the shaping rail. Additional separate rolls are mounted so as to be disposed entirely within the confines of the peripheral shaping rail for supporting the sheet interiorly of the shaping rail. Means is provided beneath the shaping rail for driving the interior rolls. Thus, supporting rolls are provided beneath the sheet for moving it into position over the continuous peripheral shaping rail, and the shaping rail moves upwardly between the rolls to lift the sheet therefrom for pressing against the complementary shaping surface.

It is, therefore, a primary object of the invention to obviate the aforementioned disadvantages of prior art devices by providing an improved construction for supporting and conveying glass sheets in press bending apparatus.

It is another object of the invention to provide a novel arrangement of conveyor rolls for use in conjunction with press bending members of irregular outline.

It is still another object of the invention to provide in press bending apparatus a system of conveyor rolls permitting use of a continuous peripheral shaping rail of irregular outline.

A further object of the invention is to provide press bending apparatus for producing irregularly shaped glass sheets having smooth continuous peripheral marginal portions.

Other objects and advantages will become apparent during the course of the following description when taken in connection with the accompanying drawings.

BRIEF DESCRIPTION OF THE DRAWINGS

In the accompanying drawings, wherein like numerals refer to like parts throughout.

DETAILED DESCRIPTION OF THE PREFERRED EMBODIMENT

Figure 1:
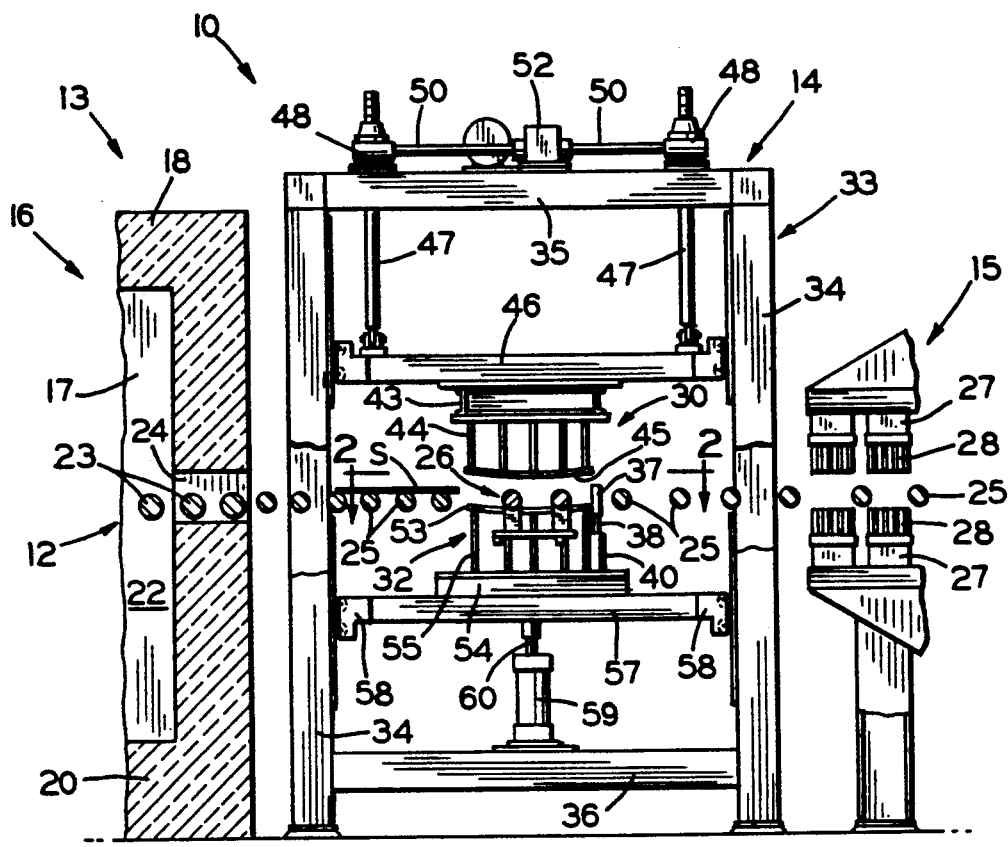
FIG. 1 is a side elevational view, with parts broken away, of a bending apparatus interposed between a glass heating furnace and a glass tempering station and embodying the sheet supporting and conveying apparatus of the invention.

Referring now to the drawings, and in particular to FIG. 1, there is shown generally at 10 a glass sheet bending and tempering apparatus embodying the invention. In accordance with the invention a conveyor system 12 carries a succession of glass sheets S (only one shown) along a generally horizontal path through the bending and tempering apparatus 10, more particulary comprising, in contiguous relationship, a heating section 13, a bending section 14 and a tempering section 15. The sheets thus pass immediately from one section to the next adjacent section.

In such apparatus the heating section 13 generally comprises a tunnel-type furnace 16 including a heating chamber 17 defined by a top wall 18, a bottom wall 20, and opposite side walls 22, all formed of a suitable refractory material. The heating chamber 17 is appropriately heated by suitable heating means such as gas fired burners or electrical resistance heating elements (not shown), for example, located in the top and side walls of the furnace. The sheets S are advanced through the heating chamber on a series of conveyor rolls 23 which form a part of the conveyor system 12, and extend from the entrance end (not shown) of the furnace 16, through an oppositely disposed exit end opening 24, and to the bending section 14.

The sheets S are heated to substantially their softening point while passing through the chamber 17 and, upon emerging from the chamber through the opening 24, are carried into the bending section upon a second series of conveyor rolls 25 constituting a part of the conveyor system 12. The sheets are received from the rolls 25 upon a system of rolls shown generally at 26 to be hereinafter described, which collectively move the sheets into and within the bending section 14 between a pair of press members. The press members, as will be hereinafter more fully described, impart the desired curvature to the sheets S.

Following bending between the press members, the bent sheets S are advanced along the path by the roll system 26 and onto additional ones of the rolls 25 forming part of the conveyor system 12, which advance the bent sheets into and through the tempering section 15 wherein their temperature is rapidly reduced to properly temper the glass. As illustrated in FIG. 1, the tempering section generally comprises blastheads 27 disposed above and below the path of movement of the glass sheets and provided with a series of tubes 28 operable to direct opposed streams of cooling fluid, generally air, toward and against the opposite surfaces of the sheets at relatively high velocity as they move through the tempering section on the conveyor.

The bending apparatus in accordance with the invention comprises an upper male press member 30 and a lower, female press member 32, the male and female press members having opposed complemental shaping surfaces defining the desired curvature to which the sheets are to be bent. The press members 30 and 32 are mounted for vertical reciprocating movement toward and away from each other within a structural framework 33 comprised of vertically disposed columns or cornerposts 34 interconnected by horizontally extending beams 35 to form a rigid structure. A base 36 extends between the upright columns adjacent their lower ends for supporting the lower or female press member 32 and its associated parts. The male press member 30 is mounted upon the beams 35 above the rolls 25 and the roll system 26.

Laterally spaced locator stops 37 are appropriately positioned in the path of the advancing sheets to stop and precisely position them in the desired location relative to the press members 30 and 32. Each such stop is affixed to the piston rod 38 of a fluid actuated cylinder 40 mounted upon a carriage 42 to be described. The cylinders 40 are operable to raise and lower the stops 37 in timed sequence between an upper position above the conveyor roll system 26 and in the path of movement of the sheets S, and a lower position therebeneath.

The male press member 30 includes a base structure 43 for supporting a mold element 44 having a downwardly directed, generally convex shaping surface 45 to impart the desired curvature to the sheet. The specific outline and curvature of the shaping surface 45 will, of course, be dictated by the particular curvature and configuration to be imparted to the glass sheet, and can vary widely, as desired Also, it is contemplated that the male mold element may comprise either a continuous shaping surface or a peripheral shaping rail of outline or ring-type construction.

The base structure 43 carrying the mold element 44 is affixed to a platform 46 which, in turn, is suspended from the horizontal beams 35 as by shafts 47 extending from screw jacks 48 carried by the beams. The screw jacks are connected by drive shafts 50 to a drive unit 52. Thus, by operating the drive unit the screw jacks 48 are driven in unison to raise or lower the platform 46 and the male press member 30 carried thereby to selected operating positions.

Figure 3:
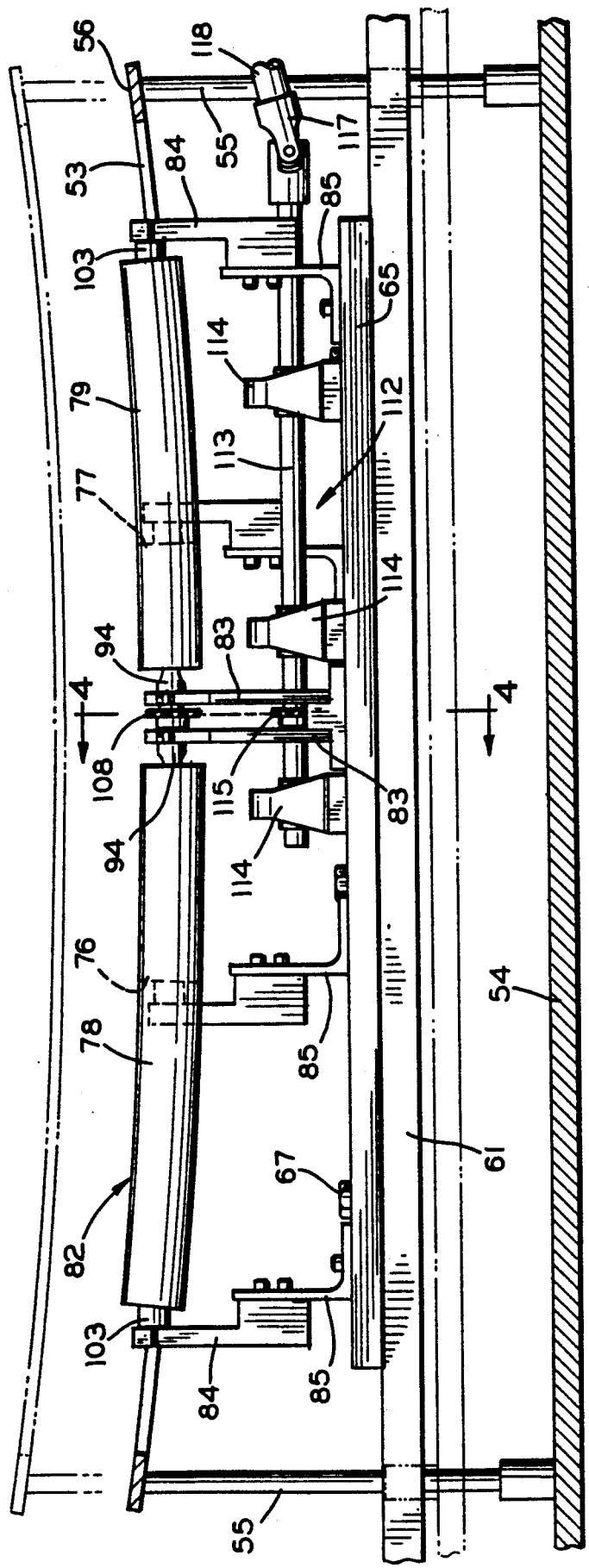
FIG. 3 is an enlarged elevational view, partially in section, taken substantially along line 3—3 of FIG. 2 and illustrating in broken lines the lower press member and shaping rail in their raised position.

As best seen in FIGS. 1 and 3, the lower or female press member 32 includes an outline or ring-type shaping rail 53 affixed to a base 54 in spaced relation thereto by means of a plurality of mounting posts 55. The shaping rail conforms in outline to the glass sheets S to be bent, and is provided on its upper face with a generally concave shaping surface 56 complementary to the male press member shaping surface 45, in opposed relation thereto. The shaping rail 53 and its relation to the roll system 26 will be hereinafter more fully described.

The base 54 is carried upon a platform 57 mounted for vertical reciprocating movement within the structural framework 33. Guide means 58 are provided at the corners for confining the platform to precise vertical path defined by the columns or corner posts 34. The platform is supported for vertical movement by a fluid actuator 59 mounted on the base 36. A suitable piston rod 60 of the fluid actuator is affixed to the platform, the piston rod thus serving to raise and lower the platform, and hence the female press member and shaping rail carried thereby, between its lowered position beneath the rolls of the roll system 26 and its raised position thereabove for lifting a heated sheet S from the rolls and pressing it against the male press member 30 and between the complemental shaping surfaces 45 and 56 to form the sheet to the desired curvature. Following bending, the piston rod 60 is retracted to lower the shaping rail 53 below the conveyor rolls and deposit the bent sheet thereon for advancement into the adjacent tempering section 15.

The conveyor rolls located within the press bending section for supporting and conveying the glass sheets in conjunction with the lower press member were initially straight rolls of uniform diameter extending transversely of the path of travel of the sheets. Subsequent developments include the use of flexible rolls which tend to assume the curvature imparted to the bent sheets deposited thereon after press bending, and rolls having arcuately curved intermediate sections which are disposed in a common plane for supporting the sheets prior to bending and then pivoted downwardly to define a supporting surface complementary to the curvature imparted to the sheet for receiving the bent sheet from the lower press member. In each such roll configuration the lower or female press member, which is of outline or ring-type construction, of necessity utilizes a shaping rail comprised at least in part of a plurality of segments arranged end-to-end in the desired outline pattern, with adjacent ends of the segments being spaced apart sufficiently to permit passage of the shaping rail between adjacent rolls during raising and lowering of the female press member in the press bending cycle.

In order to avoid, or at least minimize, sagging of the heat-softened glass into the unsupported spaces or gaps between adjacent segments of the shaping rail, various ways of minimizing the distance between adjacent segments have been employed. In one such construction, the conveyor rolls in the bending area were made of relatively small diameter so as to require a minimum spacing between the shaping rail segments. The glass sheets being bent were of a generally rectangular outline so that two opposite sides of the shaping rail could extend parallel to and be between adjacent conveyor rolls, and thus the sides could be continuous. The other two sides, or ends, of the shaping rail extended generally perpendicular to the rolls so that, while those sections were, of necessity, segmented, the spacing between segments could be minimal and the shaping rail would adequately support the sheet, the gaps between segments notwithstanding.

Figure 2:
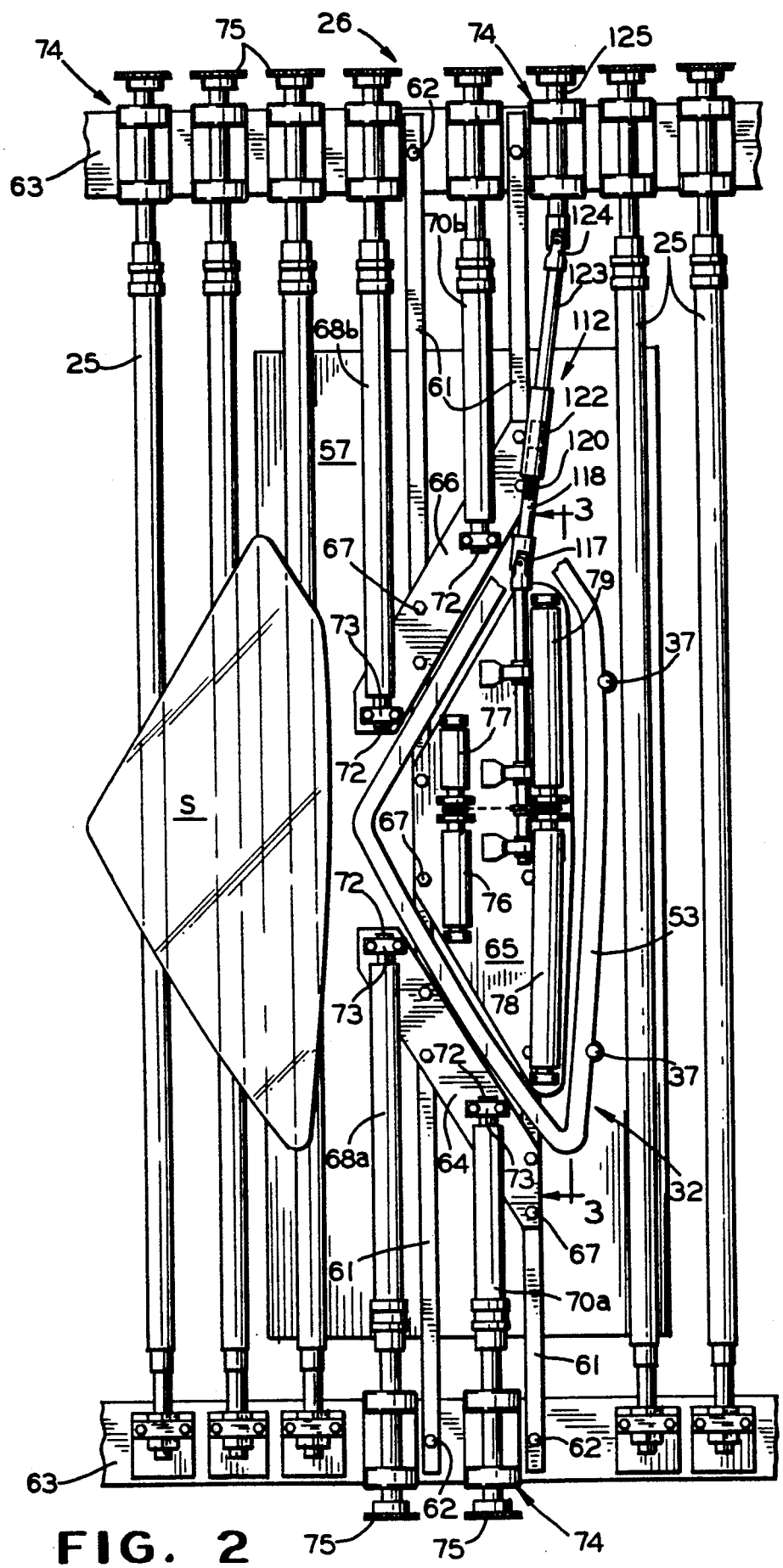
FIG. 2 is an enlarged top plain view taken substantially along line 2—2 of FIG. 1, illustrating the relationship between the conveyor rolls and the shaping rail of the lower press member.

With the advent in automotive styling of glass sheets having irregular outlines, or complex configurations in plan as illustrated, by way of example, by the sheet S in FIG. 2, an additional problem is encountered in that for at least some of the sides the transversely extending rolls intersect the shaping rail obliquely, or at an acute angle. As a result, the spaces or gaps required in the shaping rail for passage of conventional straight rolls is increased to the point that the unsupported heat-softened glass may sag thereinto and acquire an unacceptable shape. In order to overcome this problem, it has been proposed in U.S. Pat. No. 4,116,662 to employ specially configured segmented conveyor rolls having segments interconnected at their offset inner ends by a bar extending in a direction generally perpendicular to the longitudinal axis of the associated portion of the shaping rail. The shaping rail thus requires a gap or space only large enough to permit passage of the connecting bar for movement of the lower press member between its lowered and raised positions.

While the prior art devices perform well for their intended purposes, they do generally necessitate discontinuities in the shaping rail which can result in a certain amount of undesirable distortion in the bent sheet. In accordance with the present invention, this situation is obviated by provision of the novel roll system 26 wherein separate individual rolls are provided for supporting and conveying the glass sheets inside and outside the shaping rail 53. Consequently, a continuous outline shaping rail is employed providing uninterrupted support around the periphery of the glass sheet.

In present day press bending it is conventional to employ so called composite type conveyor rolls for conveying the heated sheets into position for press bending and to then convey the bent sheets into the adjacent tempering section. As disclosed, for example, in U.S. Pat. No. 4,167,997 to Revells, such rolls employ a central core or mandrel having a flexible sleeve disposed thereover. The sleeve is rotated about the core for carrying the heated sheets. By appropriately curving the core or mandrel, the rolls can be formed to desired curvatures for conveying the heated sheets into and through the press bending station. As suggested in the aforementioned U.S. Pat. No. 4,167,997, the central core of the roll may be rotated to different angular positions for selectively changing the roll to provide either a planar or a curved supporting member.

In order to impart a degree of curvature to the heat softened sheet prior to its arrival at the press bending station, the succession of rolls 25 delivering the sheets to the lower female press member 32 may be formed with gradually increasing degrees of curvature so that the sheet will progressively sag into conformity therewith and assume a preliminary bent configuration The rolls 25 carrying the bent sheets from the lower press member to the tempering section likewise are formed with a curvature conforming to that of the bent sheets for providing support until the sheets are cooled sufficiently to retain their shape. The construction of such rolls is believed well known as illustrated by the aforementioned patent, and further description is believed unnecessary.

The roll system 26 within the press bending area likewise comprises composite-type rolls exhibiting a curvature compatible with that of the bent sheets. More particularly, as best seen in FIGS. 2 and 3, the roll system 26 includes a pair of transversely extending stationary support beams 61 carried at their outer ends as by being affixed by bolts 62 to the bearing rails 63 carrying the rolls 25. Appropriately configured support plates 64, 65, and 66 are, in turn, secured atop the support beams 61 as by bolts 67. The glass sheet S to be press bent has been illustrated as being of generally triangular configuration in plan. However, it will be readily appreciated that the invention may be beneficially employed in press bending sheets of any configuration, including generally rectangular or square parts, inasmuch as it avoids the necessity for providing discontinuities or interruptions in the shaping rail. In bending a generally triangular part as shown in FIG. 2, the press bending members 30 and 32 are preferably oriented so that the long side, or base, of the triangle is the leading side and is generally parallel to the longitudinal axes of the rolls 25. Thus, the number of rolls which are intersected by the shaping rail is minimized.

As will be readily apparent, actual placement of the rolls within the roll section 26 will be dictated by the configuration of the shaping rail 53. Roller supports must be provided both outside and within the shaping rail at intervals which insure that the sheets S will not drop through the conveyor between adjacent rolls. To that end, in the embodiment illustrated in FIG. 2, pairs of stub rolls 68a and 68b and 70a and 70b are provided for supporting the sheets outside the shaping rail as they are conveyed into position above the shaping rail. The stub rolls are of a construction similar to that of the rolls 25 except that at their distal or interior ends, the cores or mandrels 72 of the rolls are carried in a bracket 73 affixed to their corrresponding support plate 64 or 66. At their outer end the stub rolls are of conventional construction for mounting the core and driving the fabric sleeve thereon. Thus, the rolls are journalled in bearing assemblies 74 carried by the bearing rails 63 and are provided with sprockets 75 adapted to be driven in common as by a drive chain (not shown). The stub rolls 68a and 70a are, of course, journalled in bearing assemblies 74 and provided with drive sprockets 75 at the side of the conveyor opposite that of the main drive line.

As best seen in FIG. 2, in order to support the sheet as it advances into position over the shaping rail 53 and to receive the bent sheet as the shaping rail is lowered following press bending, there is provided within the confines of the peripheral shaping rail auxiliary rolls 76, 77, 78, and 79. The auxiliary rolls are positioned so as to distribute their support over the area within the shaping rail and to, in association with the stub rolls 68a and b and 70a and b, assure that sheets are adequately supported to be carried through the press bending area. The actual number, length and location of such rolls will, of course, depend upon the size and configuration of the particular glass part being press bent. The ends of both the stub rolls and the auxiliary rolls should preferably closely approach the shaping roll to minimize the unsupported distance thereacross.

As best seen in FIG. 3, the auxiliary rolls 76, 77, 78, and 79 are of similar construction and more particularly comprise a roll body, identified generally at 82, supported at its drive end upon a pedestal 83 affixed to the support plate 65 and at its remote or distal end in a clamping post 84 affixed by means of an angle bracket 85 to the support plate.

Figure 5:
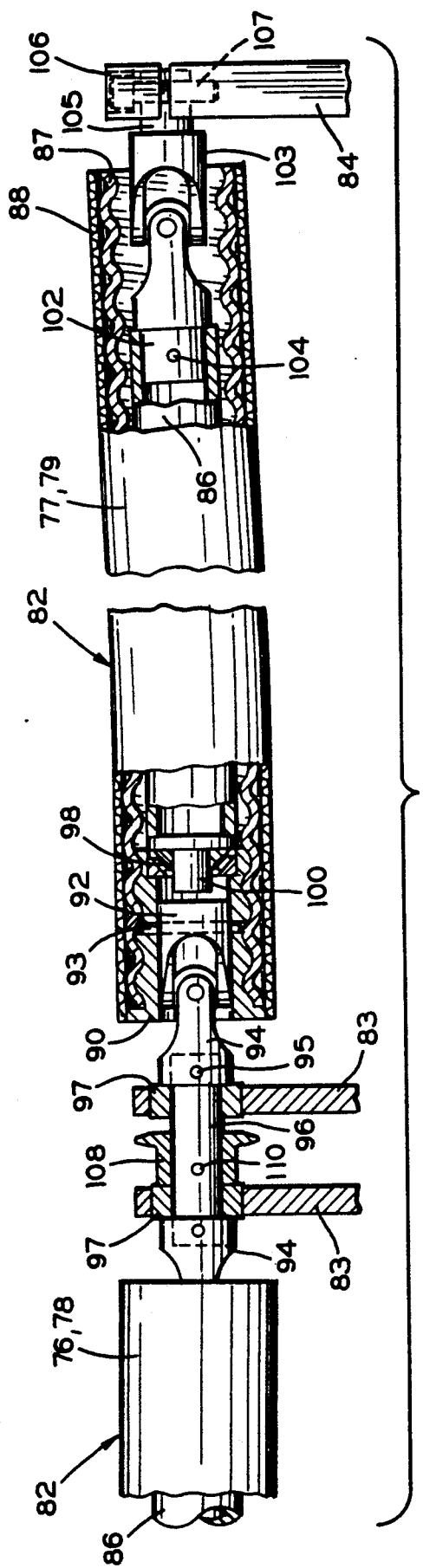
FIG. 5 is an enlarged elevational view, partially in section and with parts broken away, of the short rolls within the shaping ring, showing details of the mounting and drive coupling therefor.

As best illustrated in FIG. 5, the auxiliary rolls 76 through 79 comprise a hollow, stationary central core member or mandrel 86 and an outer flexible load-carrying sleeve 87 The core member may be arcuately curved to define a correspondingly curved support for the glass sheets To facilitate rotation of the outer sleeve 87 about the core member 86, the sleeve may advantageously comprise, as with the sleeves of the stub rolls and conveyor rolls 25, a convoluted liner formed of a suitable anti-friction material, such as a fluorocarbon resin for example, covered with a layer of stainless steel mesh to reinforce the same and prevent kinking thereof. Thus, while the outer sleeve 87 is flexible for rotating in conformity with the arcuate shape of the central core 86, it is capable of transmitting torque without significant axial twist or distortion. The sleeve may be covered as by a layer of fiberglass material 88 to provide a resiliently yieldable, heat resistant, non-marring surface upon which the glass sheets are received.

At the drive end of the roll the sleeve member 87 is coupled to a rotatable drive member 90 connected by means of a tubular insert 92 and pin 93 to one end of a universal coupling 94. The other end of the universal coupling is suitably affixed as by a pin 95 to a shaft 96 journalled in bearings 97 carried by the pedestals 83. A bearing insert 98 at the opposite end of the drive member 90 rotatably receives an extension shaft 100 projecting from the end of the core member 86. At the opposite end of the roll an extension portion 102 of a universal joint-type fitting 103 is affixed within the end of the central core member 86 as by a pin 104. A stub shaft 105 projecting from the other end of the fitting 103 rests within a correspondingly shaped recess atop the clamping post 84, and a saddle 106 secured to the clamping post by stud bolts 107 affixes the central core 86 to the post 84 in selected angular positions A drive sprocket 108 is affixed to the shaft 96 as by a pin 110 for rotatably driving the universal couplings 94, and hence the sleeves 87, of pairs of associated rolls 76 and 77 or 78 and 79 as will be hereinafter described.

Figure 4:
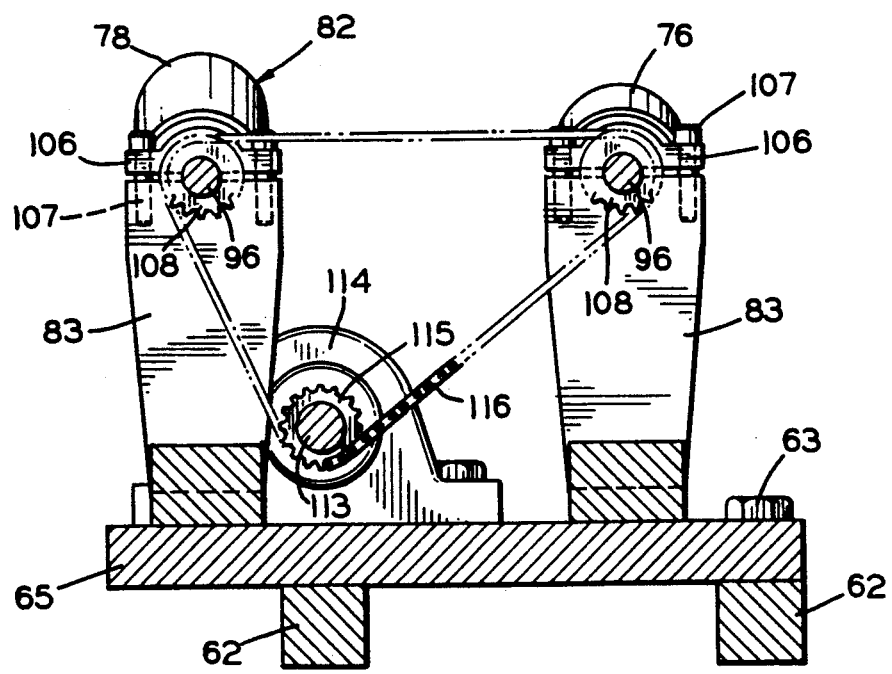
FIG. 4 is an enlarged fragmentary view, partly in section, taken substantially along line 4—4 of FIG. 3 and illustrating the drive for the interior rolls.

In order to drive the auxiliary rolls without interfering with operation of the lower female press member 32, there is provided beneath the auxiliary rolls and the shaping ring a drive assembly, identified generally at 112. As best illustrated in FIGS. 2 and 3, the drive assembly includes a drive shaft 113 journalled for rotation in bearing stands 114 carried by the support plate 65. A sprocket 115 is affixed on the shaft in alignment with the drive sprockets 108 on the shafts 96, and a drive chain 116 is entrained about the sprockets (FIG. 4). A universal joint 117 at the end of the drive shaft includes a stub shaft 118 having a splined end 120 adapted to be slidingly received in a similarly interiorly splined coupling 122 of a connecting shaft 123. The shaft 123, in turn, is coupled by a universal joint 124 to a drive shaft 125 carried in one of the bearing assemblies 74 mounted on the bearing rail 63. The drive shaft 125 has a sprocket 75 adapted to be suitably driven either independently, or along with the sprockets 75 of the rolls 25, 68b and 70b.

It will thus be readily appreciated that the stub rolls 68a, 68b, 70a, and 70b and the auxiliary rolls 76, 77, 78, and 79 are positioned to functionally interrelate with the lower press member in conveying the sheets S into position over the shaping rail 53, and to receive the press bent sheets from the shaping rail to advance them onto the rolls 25 for movement into and through the tempering section 15. To that end two of the stub rolls, as well as two of the auxiliary rolls, may be disposed in longitudinally aligned relationship. The two aligned auxiliary rolls may be spaced from one another and connected to a common mounting shaft at their adjacent ends. As herein described and as shown in FIG. 2, a second pair of the auxiliary rolls may be provided in offset relation to the first pair. The stub rolls and auxiliary rolls provide support for the heat softened sheets closely adjacent either side of the peripheral shaping rail without the existence of gaps or discontinuities in the shaping rail. The apparatus can be changed relatively easily from production of one part to another by merely unfastening the support beams 61 and bearings 74 of the stub beams from the bearing rails 63, disengaging the stub shaft 118 from the coupling 122, removing the assembly, and substituting in its place another assembly having the roll configuration appropriate for the shaping rail employed in press bending the different part.

Figure 6:
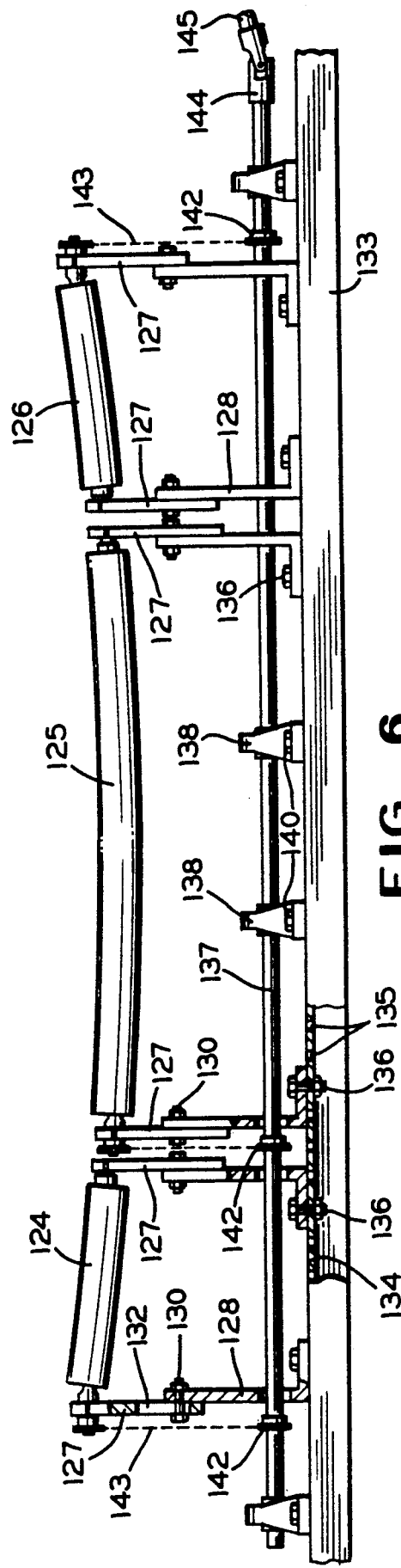
FIG. 6 is a view similar to FIG. 3, showing an alternate embodiment of the invention.

There is shown in FIG. 6 an alternate embodiment of the invention particularly suited to the press bending of larger, generally rectangular glass sheets and which affords additional flexibility in the selection and placement of the auxiliary rolls within the confines of the continuous peripheral shaping rail. Thus, auxiliary rolls 124, 125, and 126, of construction similar to the rolls 76 through 79, are suitable supported at their ends in posts 129 attached to angle brackets 128 as by bolts 130 received within elongated slots 132 in the posts. The vertical position or elevation of the rolls may thus be adjusted by moving the posts up or down, relative to their associated angle brackets within the confines of the slots and tightening the bolts with the rolls at the desired elevation. The angle brackets are supported upon a base 133 adapted to be carried at its ends (not shown) by the bearing rails 63. The base includes a support plate 134 having suitable openings 135 distributed over its surface. The angle brackets 130 can thus be affixed to the support plate at selected locations as by bolts 136 received within appropriate ones of the openings. A line shaft 137 journalled in bearing supports 138 likewise affixed to the support plate 134 by bolts 140 in selected ones of the openings, carries sprockets 142 appropriately positioned therealong for driving the various auxiliary rolls by means of chains, shown schematically at 143, drivingly engaging the sprockets 108 thereof. A universal joint 144 at the end of the line shaft has a stub shaft 145 adapted to be received in the coupling 122 for drivingly connecting the line shaft to the drive shaft 125.

The alternate embodiment of the roll system is thus readily adaptable for use with various forms of lower female press members 32 having continuous peripheral shaping rings. Moreover, the components can be assembled and adjusted prior to installation, and the entire unit can be readily substituted for another unit upon changing from production on one part to another by merely disconnecting the base 133 from the stub shaft 145, removing the old unit, and inserting the new one.

It is to be understood that the forms of the invention herewith shown and described are to be taken as illustrative embodiments only of the same, and that various changes in the shape, size and arrangement of parts, as well as various procedural changes, may be resorted to without departing from the spirit of the invention.

What is claimed is:

1. Apparatus for press bending heat-softened glass sheets comprising a conveyor means having rolls for moving a sheet to be bent along a predetermined, generally horizontal to a press bending station, said press bending station including a vertically movable bending member having a continuous peripheral shaping rail conforming to the marginal outline of the glass sheet to be bent, at least one stub roll extending transversely of said conveyor means outside said shaping rail and having an inner end adjacent said shaping rail, at least one auxiliary roll independent from said stub roll and disposed entirely within the outline of said peripheral shaping rail, means beneath said shaping rail for driving said auxiliary roll, and means operable to selectively raise and lower said bending member for moving said shaping rail between a lowered position below said stub roll and said auxiliary roll and a raised position thereabove whereby said shaping rail lifts a sheet to be bent from said stub and auxiliary rolls for pressing between said shaping rail and a mating press member and deposits the bent sheet on said stub and auxiliary rolls for advancement out of said press bending station, spaced bearing rails along either side of said conveyor means for carrying the rolls of said conveyor means, a base member extending transversely of said conveyor means and removably supported at its ends upon said bearing rails, and means mounting said at least one auxiliary roll upon said base member.

2. Apparatus for press bending heat-softened glass sheets as claimed in claim 1, including at least two of said stub rolls extending transversely of said conveyor means outside said shaping rail.

3. Apparatus for press bending heat-softened glass sheets as claimed in claim 1, wherein two of said stub rolls are disposed in longitudinally aligned relationship outside of said shaping rail.

4. Apparatus for press bending heat-softened glass sheets as claimed in claim 1, including at least two of said auxiliary rolls disposed within the outline of said shaping rail.

5. Apparatus for press bending heat-softened glass sheets as claimed in claim 4, wherein two of said auxiliary rolls are disposed in longitudinally aligned relationship inside said shaping rail.

6. Apparatus for press bending heat-softened glass sheets as claimed in claim 4, wherein two of said auxiliary rolls are disposed in longitudinally offset relationship inside said shaping rail.

7. Apparatus for press bending heat-softened glass sheets as claimed in claim 1, wherein said auxiliary roll comprises an inner core member and an outer load carrying sleeve surrounding said core member, said driving means being connected to said sleeve for rotating said sleeve about said inner core member.

8. Apparatus for press bending heat-softened glass sheets as claimed in claim 7, wherein said vertically movable bending member includes a base above which said shaping rail is supported, and said base member extends transversely of said conveyor means between said base and said shaping rail, said means mounting said at least one auxiliary roll upon said base member includes, a bracket affixed to said base member and a post on said bracket supporting said inner core member at one of its ends.

9. Apparatus for press bending heat-softened glass sheets comprising a conveyor means having rolls for moving a sheet to be vent along a predetermined, generally horizontal path to a press bending station, said press bending station including a vertically movable bending member having a continuous peripheral shaping rail conforming to the marginal outline of the glass sheet to be bent, at least one stub roll extending transversely of said conveyor means outside said shaping rail and having an inner end adjacent said shaping rail at least one auxiliary roll disposed entirely within the outline of said peripheral shaping rail, said auxiliary roll comprising an inner core member and an outer load carrying sleeve surrounding said core member, means beneath said shaping rail for driving said auxiliary roll, said driving means being connected to said sleeve for rotating said sleeve about said inner core member, and means operable to selectively raise and lower said bending member for moving said shaping rail between a lowered position below said stub roll and said auxiliary roll and a raised position thereabove whereby said shaping rail lifts a sheet to be bent from said stub and auxiliary rolls for pressing between said shaping rail and a mating press member and deposits the bent sheet on said stub and auxiliary rolls for advancement out of said press bending station, said vertically moveable bending member including a base above which said shaping rail is supported, including stationary support means extending transversely of said conveyor means between said base and said shaping rail, a bracket affixed to said support means, and a post on said bracket supporting said inner core member at one of its ends, said driving means including a drive shaft journalled on bearing stands carried by said stationary support means, means rotating said drive shaft, and means drivingly coupling said drive shaft to said outer sleeve for rotating said sleeve about said inner core member.

10. Apparatus for press bending heat-softened glass sheets as claimed in claim 9, wherein said post includes means releasable clamping said inner core member in selected angular positions.

11. Apparatus for press bending heat-softened glass sheets as claimed in claim 9, said auxiliary roll including a drive end opposite said one end, said means drivingly coupling said drive shaft to said outer sleeve comprising a shaft extending axially from the drive end of said inner core member, a bearing insert on said shaft, a rotatable drive member journalled on said bearing insert and affixed to said sleeve, a universal joint coupled at one end to said rotatable drive member, a mounting shaft extending from the opposite end of said universal joint, said mounting shaft being journalled for rotation in a pedestal carried by said support means, and means on said mounting shaft for drivingly coupling said drive shaft to said mounting shaft for rotating said outer sleeve.

12. Apparatus for press bending heat-softened glass sheets as claimed in claim 9, including a plurality of said auxiliary rolls disposed within the peripheral outline of said shaping rail and extending generally transversely of said conveyor.

13. Apparatus for press bending heat-softened glass sheets as claimed in claim 12, including two said auxiliary rolls in generally axial alignment, said two auxiliary rolls being spaced from one another and connected to a common said mounting shaft at their adjacent ends.

14. Apparatus for press bending heat-softened glass sheets as claimed in claim 13, including a second pair of said aligned auxiliary rolls offset longitudinally from said first named rolls.

15. Apparatus for press bending heat-softened glass sheets as claimed in claim 14, wherein said shaping rail is of generally triangular outline in plan and includes a base side extending generally transversely of said conveyor means and an apex opposite said base, said second pair of auxiliary rolls being located along said base side and said first two auxiliary rolls being shorter than said second pair and positioned intermediate said second pair and said apex.

16. Apparatus for press bending heat-softened glass sheets comprising a conveyor means having rolls for moving a sheet to bent along a predetermined, generally horizontal path to a press bending station, said press bending station including a vertically movable bending member having a continuous peripheral shaping rail conforming to the marginal outline of the glass sheet to be bent, at least one stub roll extending transversely of said conveyor means outside said shaping rail and having an inner end adjacent said shaping rail, at least one auxiliary roll disposed entirely within the outline of said peripheral shaping rial, means beneath said shaping rail for driving said auxiliary roll, and means operable to selectively raise and lower said bending member for moving said shaping rail between a lowered position below said stub roll and said auxiliary roll and a raised position thereabove whereby said shaping rail lifts a sheet to be bent from said stub and auxiliary rolls for pressing between said shaping rail and a mating press member and deposits the bent sheet on said stub and auxiliary rolls for advancement out of said press bending station, spaced bearing rails along either side of said conveyor means for carrying the rolls of said conveyor means, a base member extending transversely of said conveyor means and removably supported at its ends upon said bearing rails, means mounting said at least one auxiliary roll upon said base member, and means mounting said means for driving said auxiliary roll upon said base member whereby said base member, auxiliary roll and driving means is adapted for removal and replacement as a unit.

17. Apparatus for press bending heat-softened glass sheets as claimed in claim 16, wherein said auxiliary roll mounting means comprises angle brackets and said means mounting said driving means comprises bearing supports, including a plurality of openings distributed over said base member and fastening means releasably securing said angle brackets and said bearing supports to said base member through selected ones of said openings whereby said base member is adapted to accommodate different said auxiliary rolls and driving means.

* * * * *